Feb. 13, 1923.
N. H. COWELL ET AL.
HACK SAW.
FILED JULY 1, 1920.
1,445,491.
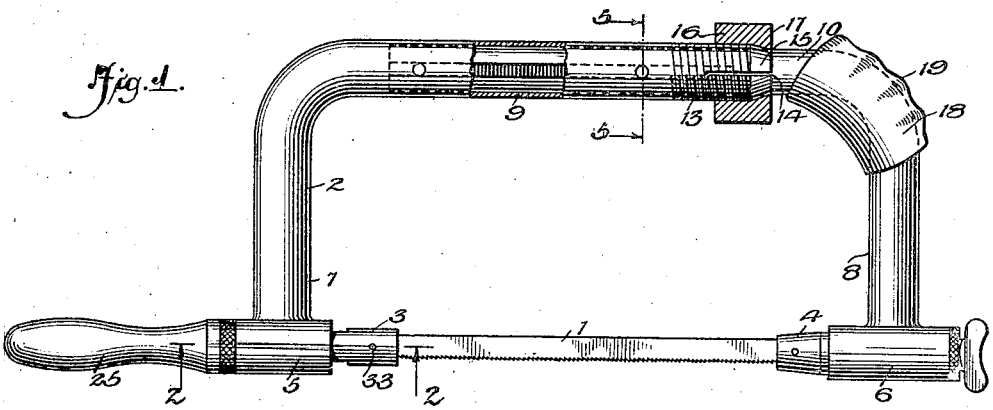
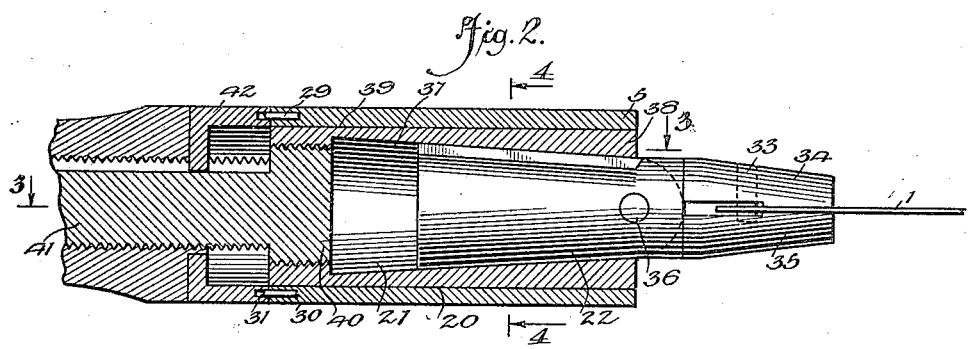
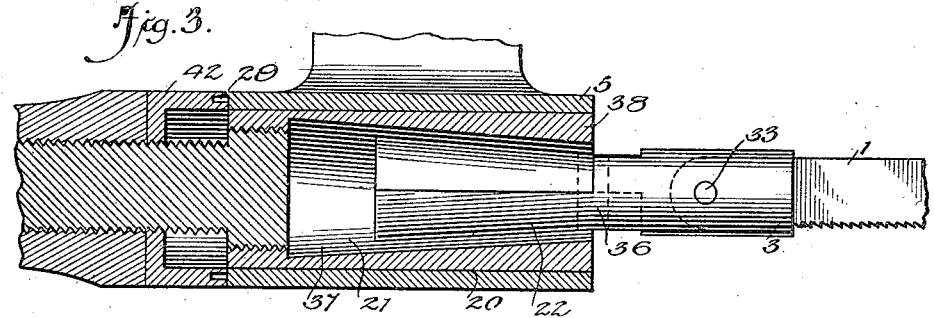
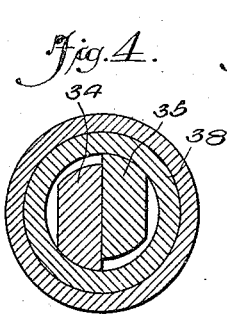
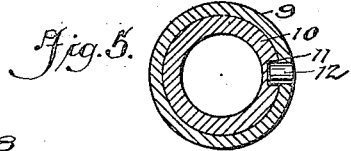
WITNESSES
INVENTOR
Nelson H. Cowell
Edward Niederman
BY
ATTORNEYS Patented Feb. 13, 1923.

1,445,491

UNITED STATES PATENT OFFICE.

NELSON H. COWELL, OF NEW YORK, AND EDWARD NIEDERMAN, OF ELMHURST, NEW YORK.

HACK SAW.

Application filed July 1, 1920. Serial No. 393,228.

*To all whom it may concern:*

Be it known that we, NELSON H. COWELL and EDWARD NIEDERMAN, both citizens of the United States, and residents, respectively, of the city of New York, borough of Manhattan, in the county and State of New York, and Elmhurst, borough of Queens, in the county of Queens and State of New York, have invented a new and useful Hack Saw, of which the following is a full, clear, and exact description.

This invention relates to hacksaw frames, and has for an object to provide an improved construction whereby different sized hacksaws may be readily utilized.

Another object of the invention is to provide an adjustable hacksaw with means for gripping and holding hacksaws which have been broken off either at one or both ends.
A further object of the invention is to provide an improved jaw for hacksaws wherein not only means are provided for engaging eyes in a hacksaw but gripping jaws are provided which will grip the end of a hacksaw and hold the same in place.

In the accompanying drawings:

Figure 1 is a side view of a hacksaw frame with a hacksaw arranged therein, said frame disclosing an embodiment of the invention, certain parts being broken away for better illustrating the construction.

Figure 2 is a fragmentary sectional view through Figure 1 taken on lines 2—2 in the direction of the arrows.
Figure 3 is a sectional view through Figure 2 taken on lines 3—3.

Figure 4 is a transverse sectional view taken on lines 4—4 of Figure 2 and Figure 5 is a cross sectional view through Figure 1 on lines 5—5.

Referring to the accompanying drawings by numerals 1 indicates a hacksaw which is positioned in the frame 2 and held in place by the jaws 3 and 4. Frame 2 is provided with heads 5 and 6 which form a part of the upstanding tubular members 7 and 8 of the frame 2, said tubular upstanding members merging into horizontal connecting sections 9 and 10, section 10 telescoping into section 9. As indicated in Figure 5, section 10 is provided with a longitudinal groove 11, receiving one or more pins 12 whereby there will be no independent rotation of one sec-
tion with respect to the other, while at the same time, permitting a free telescoping movement of the sections. Section 9 is threaded as at 13 and is provided with one or more slits 14. The end of section 9 merges into a bevel portion 15 which is adapted to coact with the nut 16 which nut is provided adjacent one end with a tapering section 17 adapted to mate with the beveled section 15. Whenever the nut 16 is tightened the threaded end of the section 9 is squeezed against section 10 and thereby the two sections are rigidly locked together. A fibre hand-hold 18 is arranged at the juncture of members 8 and 10, though rubber or other suitable material could advantageously be used, said hand-hold 18 being formed with depressions 19 suitable for receiving the fingers of the operator, to more conveniently guide the saw when operated.

In order to hold the saw blade 1 in place clamping jaws 3 and 4 are provided which are carried by heads 5 and 6 respectively, the details of which are shown in Figures 2 to 4 inclusive and to which reference is now had. From these views it will be observed that the head 5 is tubular and is formed with a cylindrical bore 20 in which is arranged a sleeve 38 which in turn is formed with a conical bore 21, in which slidably fits conical member 22. Said conical member 22 carries jaws 34 and 35 which are preferably hinged together by means of pintle pin 36. The sleeve 38 is provided with a threaded section 39 for receiving the threaded end 40 of the handle stem 41 and between the head and the handle 25 is arranged a cup-shaped member 42, having in its annular wall bores 31 for receiving the pins 29 carried by the head 5. Thus it will be noted that the sleeve 38 may be made to move within the head 5 by turning the handle 25 which is threaded to the stem 41 and thereby the jaw member 3 is drawn or released to hold the saw 1 in proper position.

The jaw 34 may be provided with a pin 33 for extending into the eye of the saw 1 if the saw has an eye. The outer end of the jaw will grip the saw and hold the same in place without the aid of pin 33, in case it is done away with or broken off. The jaw 4 could be constructed similar to jaw 3 although any other approved type will serve the purpose, since only one adjustable jaw is necessary to hold the saw 1 in position.

What we claim is:

1. A head and jaw for hacksaws comprising a tubular member acting as a head, a cylindrical member fitted into said tubular member and provided with a tapering bore extending for most of its length, and a threaded section at the end of the tapering bore, said cylindrical member being reciprocable in said tubular member, a handle receiving member screwed into said threaded section and forming one unit with the cylindrical member, a handle for holding the threaded member in position, a cup shaped washer between said handle and said tubular member for receiving the inner end of said cylindrical member and a pair of pivotally mounted jaws arranged with one tapered end fitted into said tapering bore to cooperate therewith and the other end projecting therefrom and acting as a gripping means for receiving a saw blade.

2. A head and a jaw for hacksaws comprising a tubular member acting as a head, a cylindrical member fitted into said tubular member and provided with a tapering bore extending for most of its entire length and merging into a threaded section for the remaining part of its length, a tensioning member threaded into said threaded section forming a unit with said cylindrical member, a cupped washer surrounding said tensioning member adjacent the threaded portion of said cylindrical member for permitting the inner end of the latter to advance beyond the end of said tubular member, and a pair of jaws pivotally connected together near their centers having one end projecting into said tapering bore so as to be forced against the side walls of the tapering bore when said threaded clamping member is operated in a given direction, one of said jaws being provided with a bore and the other with a pin projecting into said bore and both of said jaws being provided with gripping surfaces adjacent said pin whereby a saw may be positioned between the latter surfaces while said pin projects through a hole in the saw.

NELSON H. COWELL.
EDWARD NIEDERMAN.